United States Patent
Liu et al.

(10) Patent No.: US 10,860,849 B2
(45) Date of Patent: Dec. 8, 2020

(54) METHOD, ELECTRONIC DEVICE AND COMPUTER PROGRAM PRODUCT FOR CATEGORIZATION FOR DOCUMENT

(71) Applicant: EMC IP Holding Company LLC, Hopkinton, MA (US)

(72) Inventors: Weiyang Liu, Shanghai (CN); Kang Teng, Shanghai (CN); Yuanyi Liu, Shanghai (CN); Zengjie Zhang, Shanghai (CN); Zhijian Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 199 days.

(21) Appl. No.: 16/115,688

(22) Filed: Aug. 29, 2018

(65) Prior Publication Data
US 2019/0325212 A1 Oct. 24, 2019

(30) Foreign Application Priority Data
Apr. 20, 2018 (CN) .......................... 2018 1 0362310

(51) Int. Cl.
| G06F 16/00 | (2019.01) |
| G06K 9/00 | (2006.01) |
| G06F 17/18 | (2006.01) |
| G06N 3/04 | (2006.01) |
| G06F 16/248 | (2019.01) |

(52) U.S. Cl.
CPC ....... *G06K 9/00469* (2013.01); *G06F 16/248* (2019.01); *G06F 17/18* (2013.01); *G06K 9/00456* (2013.01); *G06N 3/0472* (2013.01)

(58) Field of Classification Search
CPC .. G06K 9/00422; G06K 9/42; G06K 9/00469; G06K 9/00456; G06F 16/353; G06F 16/954; G06F 16/951; G06F 16/9038; G06F 17/18
See application file for complete search history.

(56) References Cited

U.S. PATENT DOCUMENTS

| 6,606,620 | B1 * | 8/2003 | Sundaresan | G06F 16/30 |
| 7,117,432 | B1 * | 10/2006 | Shanahan | G06F 16/353 715/210 |
| 7,376,635 | B1 * | 5/2008 | Porcari | G06F 16/355 |
| 7,958,136 | B1 * | 6/2011 | Curtis | G06F 16/313 707/758 |
| 8,065,307 | B2 * | 11/2011 | Haslam | G06F 16/93 707/738 |
| 8,762,382 | B2 * | 6/2014 | Harrison | G06F 16/367 707/741 |
| 9,235,812 | B2 * | 1/2016 | Scholtes | G06N 5/02 |
| 2003/0212673 | A1 * | 11/2003 | Kadayam | G06F 16/951 |

(Continued)

*Primary Examiner* — Leslie Wong
(74) *Attorney, Agent, or Firm* — Chamberlain, Hrdlicka, White, Williams & Aughtry

(57) ABSTRACT

A method, electronic device and computer program product for categorizing a document that includes determining a key words associated with a document category and corresponding weight. The method also includes determining a score of the document with respect to the key word at least based on frequencies of the key word appearing in a field of the document and the weight and determining that the document is in the document category in response to the score of the document being higher than a threshold.

18 Claims, 5 Drawing Sheets

(56) References Cited

U.S. PATENT DOCUMENTS

Figure 1:
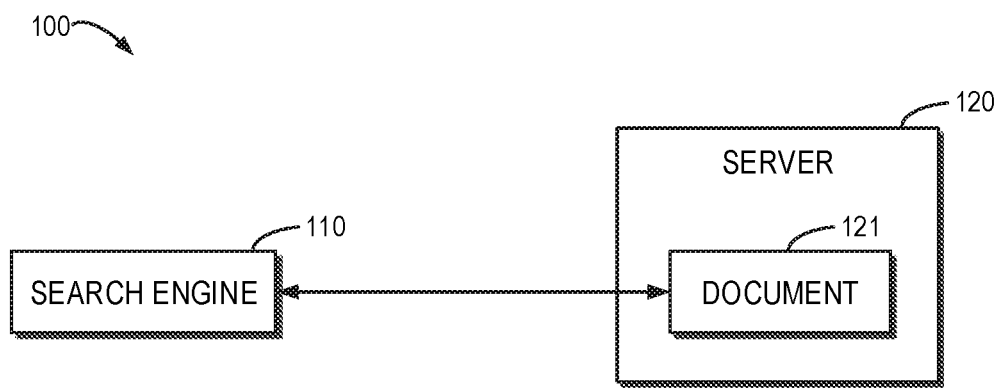

| | | | |
|---|---|---|---|
| 2006/0143175 A1* | 6/2006 | Ukrainczyk | G06F 16/313 |
| 2007/0112763 A1* | 5/2007 | Broder | G06F 16/334 |
| 2008/0114750 A1* | 5/2008 | Saxena | G06F 16/3346 |
| 2009/0067729 A1* | 3/2009 | Turkelson | G06F 16/353 382/224 |
| 2009/0157720 A1* | 6/2009 | Kolcz | G06Q 10/10 |
| 2009/0216696 A1* | 8/2009 | Downs | G06F 16/3326 706/20 |
| 2012/0117082 A1* | 5/2012 | Koperda | G06F 16/24578 707/748 |
| 2012/0278705 A1* | 11/2012 | Yang | G06F 40/258 715/254 |
| 2016/0092448 A1* | 3/2016 | Byron | G06F 16/3344 707/739 |
| 2018/0357531 A1* | 12/2018 | Giridhari | G06K 9/6267 |
| 2020/0067861 A1* | 2/2020 | Leddy | H04L 51/12 |

* cited by examiner

METHOD, ELECTRONIC DEVICE AND COMPUTER PROGRAM PRODUCT FOR CATEGORIZATION FOR DOCUMENT

FIELD

Embodiments of the present disclosure generally relate to data categorization, and specifically to a method, electronic device and computer program product for categorizing a document.

BACKGROUND

Although a current search engine will collect a large amount of backup data from different storage servers and provide a variety of complex and advanced search queries, it is still not convenient for end users to categorize and locate the backup files. Under certain situations, end users even do not know exactly what to search or what key word to use for the search. End users just want to gain a general idea about what kind of content is inside the backup by browsing through a certain search result set.

To mitigate this issue and satisfy the requirement of end users, one option is to let some reviewers manually categorize content in the search result set and add tags after previewing each item. However, it is not accurate for end users to add tags, as different people might have different subjective criteria for adding the tags. Besides, it is very difficult to manually tag all the results due to the large number of results, and thus for those untagged results, the possibility of being overlooked will be greatly increased.

SUMMARY

Embodiments of the present disclosure provide a method, electronic device and computer program product for categorizing a document.

In general, in one aspect, the present disclosure provides a method of categorizing a document. The method comprises determining one or more key words associated with a document category and corresponding weights. The method further comprises determining a score of the document with respect to the one or more key words at least based on frequencies of the one or more key words appearing in a field of the document and the weights. The method further may determine that the document is in the document category in response to the score of the document being greater than a threshold.

In general, in one aspect, the present disclosure provides an electronic device. The electronic device comprises at least one processing unit and at least one memory coupled to the at least one processing unit and storing instructions executable by the at least one processing unit. The instructions, when executed by the at least one processing unit, cause the electronic device to perform a method, the method comprising: determining one or more key words associated with a document category and corresponding weights; determining, at least based on frequencies of the one or more key words appearing in a field of the document and the weights, a score of the document with respect to the one or more key words; and in response to the score of the document being higher than a threshold, determining that the document is in the document category.

In general, in one aspect, the present disclosure provides a computer program product being tangibly stored on a non-transient computer readable medium and comprising machine executable instructions. The machine executable instructions, when executed, cause a machine to perform a the method, the method comprises determining one or more key words associated with a document category and corresponding weights; determining, at least based on frequencies of the one or more key words appearing in a field of the document and the weights, a score of the document with respect to the one or more key words; and in response to the score of the document being higher than a threshold, determining that the document is in the document category.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features and advantages of the present disclosure will become more apparent from more detailed description of some embodiments of the present disclosure with reference to the accompanying drawings, in which the same reference symbols are used to indicate the same elements.

FIG. 1 shows a schematic diagram of an architecture for categorizing a document in accordance with an embodiment of the present disclosure;

FIG. 2 shows a flowchart of a method of categorizing a document in accordance with an embodiment of the present disclosure;

FIG. 3 shows a flowchart of a method of determining if a document is in a document category based on a score in accordance with an embodiment of the present disclosure;

FIG. 4 shows a schematic diagram of a query result in accordance with an embodiment of the present disclosure;

FIG. 5 shows a block diagram of an apparatus for categorizing a document in accordance with an embodiment of the present disclosure; and FIG. 6 shows a schematic block diagram of an example device that may be used to implement embodiments of the present disclosure.

DETAILED DESCRIPTION OF EMBODIMENTS

Embodiments of the present disclosure will be described in the following in greater detail with reference to the drawings. Although embodiments of the present disclosure are shown in the drawings, it is to be understood that the present disclosure can be implemented in various manners, not limited to the embodiments illustrated herein. On the contrary, these embodiments are provided to make the present disclosure more thorough and complete and convey the scope of the present disclosure completely to those skilled in the art.

The term “comprise” and its variations used in the present disclosure mean comprising in an open-ended sense, i.e. “include without limitation”. Unless otherwise specified, the term “or” means “and/or”. The term “based on” means “at least partially based on”. The terms “one exemplary embodiment” and “one embodiment” represent “at least one embodiment”; the term “another embodiment” represents “at least one another embodiment”. The terms “first”, “second” and the like may refer to different or the same objects. Other explicit and implicit definitions might further be included in the following description.

In the present disclosure, backup data, backup document and backup file may be used interchangeably. Although in some embodiments, backup data or backup document is used as an example to illustrate a principle of the present disclosure, it is to be understood that the principle of the present disclosure may be also applicable to any other data or document.

To find out valuable content from a large amount of backup data is one requirement for enterprise customers. To address this requirement a scalable, fault-tolerant and indexing search virtual appliance has been developed. This search virtual appliance may provide: a simple and familiar search interface; complex and advanced search queries; cross-server and cross-platform searches; and support for acts such as previewing, downloading, restoring to both original and alternate locations and so on a search hit. This search virtual appliance provides a powerful way to search backup data across one or more storage servers, and then restoring or downloading the search results. The scheduled collection activities are used to gather and index the metadata and/or content of backups. The metadata and/or content is then stored within the data protection search node or cluster.

Although a current search engine will collect a large amount of backup data from different storage servers and provide a variety of complex and advanced search queries, it is still not convenient for end users to categorize and locate those backup files. Under certain situations, end users do not know exactly what to search or what key words should be used. End users just want to gain a general idea about what kind of content is inside the backup by browsing through a certain search result set by intelligent indications.

To mitigate this issue and satisfy this requirement of end users, one option is to let some reviewers manually categorize content in the search result set and add tags after previewing each item. However, this is not an ideal solution because: it will involve too much effort for end users to add tags for a large number of items; it is not accurate for end users to add tags, as different people might have different subjective criteria; it is impossible to manually tag all the results, and thus for those untagged results, the possibility of being overlooked will be greatly increased.

Embodiments of the present disclosure enable auto-categorization for backup data. With the method of the present disclosure, end users do not need to categorize those search results manually (although it is still feasible). More specifically, in one embodiment, the search engine will have a backend job running recursively to categorize all the backup documents with high relevance and add tags. This approach will not only decrease the manual categorization efforts but will also improve the accuracy of categorization.

FIG. 1 shows a schematic diagram of an architecture 100 for categorizing a document. It is to be understood that the structure and function of architecture 100 are depicted only for the purpose of illustration without suggesting any limitation to the scope of the present disclosure. Embodiments of the present disclosure may be embodied in different structures and/or functions.

As shown in FIG. 1, the architecture 100 may generally include a search engine 110 and a server 120 on which a document 121 is stored. For example, the document 121 may be data backed up with backup software. Although only one document 121 is shown, it is to be understood that a plurality of documents 121 may exist on the server 120. The search engine 110 may refer to any search tool or search product that can query the document 121 on the server 120. Although the search engine 110 shown in FIG. 1 does not reside on the server 120, it may be appreciated that the search engine 110 may also run on the same server 120 as the document 121. Alternatively, the search engine 110 may run on a client (not shown) that is separate from the server 120. The methods described below may be performed by the search engine 110 (for example, in the background).

Figure 2:
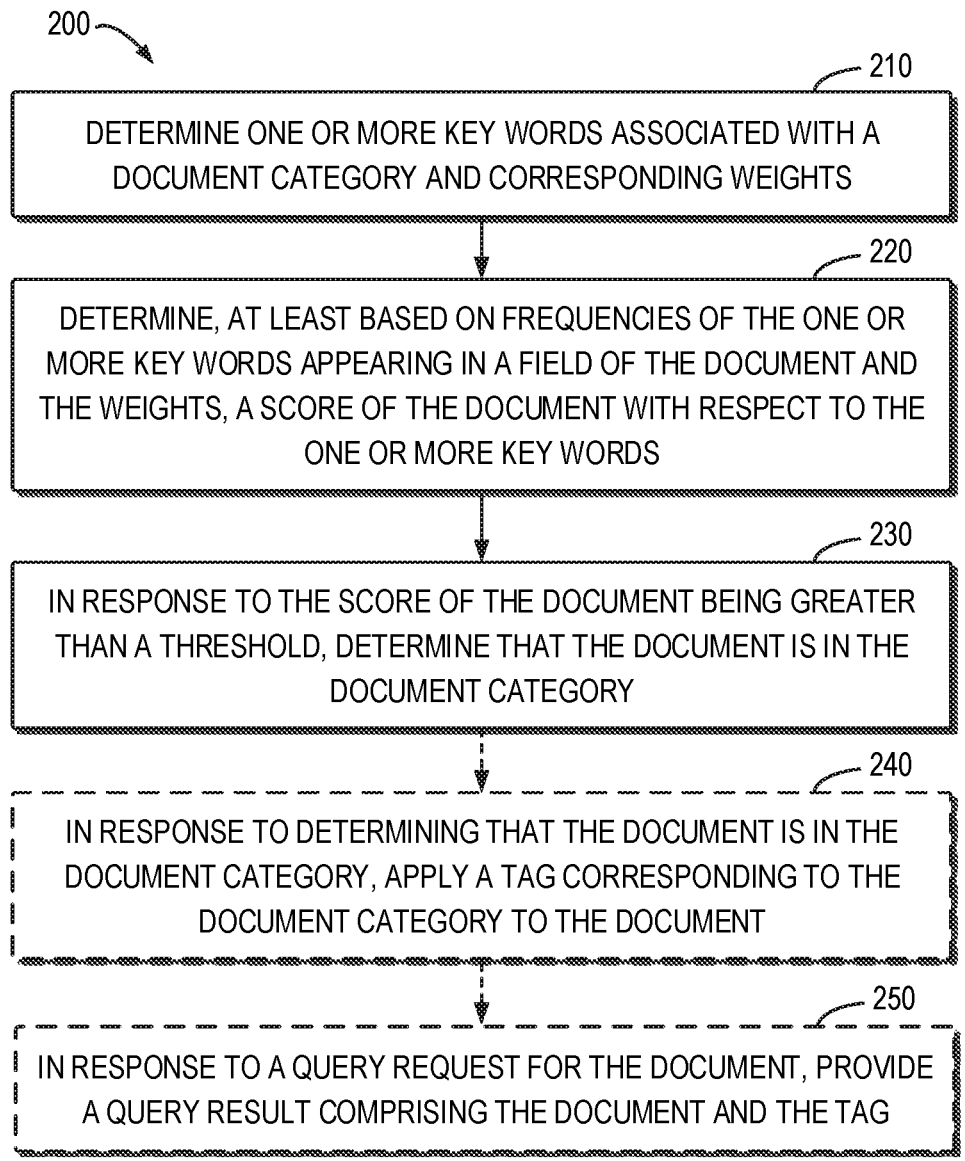

FIG. 2 shows a flowchart of a method 200 of categorizing a document in accordance with an embodiment of the present disclosure. For example, the method 200 can be implemented by the search engine 110 shown in FIG. 1. For example, when the search engine 110 is installed, index data will be loaded and then the method 200 shown in FIG. 2 may be performed. It is to be understood that the method 200 may further include additional blocks not shown and/or omit some blocks as shown. The scope of the present disclosure is not limited in this regard. All the dotted blocks in FIG. 2 are optional.

At block 210, the search engine 110 determines one or more key words associated with a document category and a weight corresponding to each key word. The document category may reflect the field to which the content of the backup document 121 relates. As an example, the document category may be sport, economy, art, geography, religion, health, history, entertainment and the like. Alternatively, the document category may be "others," which indicates that the document 121 is not related to any defined document category. For each document category, a list containing both key word (k) and weight (w) may be stored: {k1:w1, K2:w2, k3:w3, k4:w4 . . . }.

In some embodiments, the one or more key words and weights may be pre-trained by a neural network based on a text corpus. For example, a shallow, two-layer neural network may be used. The neural network may be a group of related models that are used to produce word embedding. The neural network is trained to reconstruct linguistic contexts of words. The neural network takes a large corpus of text as its input and produces a vector space. This large corpus of text may be obtained from, for instance, any article on a website. The vector space is typically of several hundred dimensions. Each unique word in the corpus is assigned a corresponding vector in the space. Word vectors are positioned in the vector space so that words sharing common contexts in the corpus are located in close proximity to one another in the space. By way of example rather than for limitation, when key words associated with a particular document category and the corresponding weights are trained, an open source machine algorithm Word2vec may be used.

With the neural network, a specific list (also referred to as "dictionary") of each document category may be trained. The list includes key words associated with a specific document category and the weight corresponding to each key word. Table 1 below shows an example dictionary for the document category "sport."

TABLE 1

Example dictionary for document category "sport"

| Word | Document category | Weight |
| --- | --- | --- |
| sport | sport | 1 |
| tournament | sport | 0.720395 |
| golf | sport | 0.70398 |
| racing | sport | 0.701108 |
| soccer | sport | 0.699806 |
| club | sport | 0.686233 |
| competitions | sport | 0.682987 |
| curling | sport | 0.679712 |
| arena | sport | 0.679201 |
| archery | sport | 0.668151 |
| football | sport | 0.666847 |

TABLE 1-continued

Example dictionary for document category "sport"

| Word | Document category | Weight |
|---|---|---|
| fencing | sport | 0.666504 |
| venue | sport | 0.657819 |
| cricket | sport | 0.655973 |
| boxing | sport | 0.654608 |
| croquet | sport | 0.653055 |

As described above, once the dictionary is trained, the trained result may be a list containing both key word (k) and weight (w) for each document category: {k1:w1, K2:w2, k3:w3, k4:w4 ... }. The weight of a key word may reflect the relevance of the key word and the document category. Considering the tradeoff between performance and computing load, during training, the number of key words associated with a specific document category to be obtained may be defined. For example, the neural network may be configured to train the top 500 high-frequency words most relevant to the document category "sport." In this way, the number of key words subsequently used for calculating the relevance score of the document 121 may be limited so as to reduce the load of the query requests and at the same time ensure accuracy of categorization.

At block 220 in FIG. 2, at least based on frequencies of the one or more key words appearing in a field of the document 121 and the weights, the search engine 110 may determine a score of the document 121 with respect to the one or more key words. In other words, considering the weights of the key words, based on the relevance of a certain document with the key words, the search engine 110 may calculate the relevance score of the document for a specific document category. In some embodiments, the search engine 110 may determine the score of the document 121 with respect to each key word, respectively, and then calculate a weighted average of these scores with the weights, as the score of the document 121 with respect to the one or more key words.

To this end, the search engine 110 may have a function of scoring the document 121. The score (referred to as "_score") of each document may be represented by a positive floating-point number. The higher the _score is, the more relevant the document is to the document category. By searching the one or more key words in the document 121, the search engine 110 may determine the score of the document 121 with respect to the one or more key words. As described above, to reduce the computing load and ensure the accuracy of categorization at the same time, only the top 500 high-frequency words most relevant to the document category may be selected to query the document 121. Per the document category, a query clause may generate _score for each document. The score is calculated depending on the type of the query clause. The search engine 110 may use the standard similarity algorithm to determine the score of the document 121. For example, the standard similarity algorithm may be based on term frequency/inverse document frequency (TF/IDF), which mainly takes term frequency (tf) as a core factor.

Term frequency (tf) is a core factor for calculating a document score and it reflects how often a term (namely, key word) used by the query appears in a field of the document. The higher a frequency of the item (key word) appearing in the field of the document is, the more relevant the document is and the higher the score (_score) is. For example, for a content field, a document containing five mentions of an item is more likely to be relevant to the document category indicated by the item than a document containing just one mention of the same item.

In some embodiments, calculating the document score may be further based on inverse document frequency (idf) and field-length norm (norm). Inverse document frequency (idf) reflects a frequency of each item appearing in the index. The higher the frequency of the item appearing in the index is, the lower a weight applied to the query for the item. For example, an item that appears in many documents in the index has a lower weight than a less common item. In other words, if the document is selected from a plurality of documents, the greater the number of documents of the plurality of documents in which a key word appears is, the lower the score of the document with respect to the key word will be. Only as an example, inverse document frequency (idf) may be calculated using the following equation:

$$idf = \frac{\log(1 + (docCount - docFreq + 0.5))}{docFreq + 0.5} \quad (1)$$

where docCount represents the total number of documents in the index, and docFreq represents the number of documents in which a specific item appears.

The field-length norm (norm) reflects a length of the field in which the item (key word) appears. The longer the field is, the less likely it is that a key word appearing in the field will be relevant. For example, for the same kind of fields, an item appearing in a shorter field will carry a higher weight than the same item appearing in a longer field. In other words, for the same kind of fields, a document with a long field in which an item appears has a lower score than a document with a short field in which the same item appears. On the other hand, as the length of the title field is generally shorter than that of the content field, the weight assigned to the title field may be higher than that assigned to the content field. Only as an example, the field-length norm (norm) may be calculated using the following equation:

$$Norm = \frac{freq * (k1 + 1)}{freq + k1 * (1 - b + b * fieldLength / avgFieldLength)} \quad (2)$$

where freq represents the frequency that an item (key word) appears, k1 and b are defined parameters, fieldLength represents the field length of the current document, and avgFieldLength represents the average length of the same fields of different documents.

In some embodiments, the document score may also be calculated based on the number of key words of the one or more key words appearing in the field of the document. The greater the number of key words appearing in the field of the document is, the higher the score of the document will be. As an example, a first document only mentions the key word "sport," while a second document mentions three key words "cricket," "boxing" and "croquet." As the second document contains a greater number of key words, the score of the second document may be improved.

In some embodiments, the search engine 110 may determine the score (_score) of the document 121 with respect to the one or more key words using a practical scoring function. Then, the score (_score) of the document may be calculated using the following equation:

$$\_score(q, d) = \text{queryNorm}(q) \cdot \text{coord}(q, d) \cdot \Sigma(tf(t \text{ in } d) \cdot idf(t)^2 \cdot t \cdot \text{getBoost}(\ ) \cdot \text{norm}(t, d))(t \text{ in } q) \quad (3)$$

where q represents a query, d represents a specific document, t represents an item (key word) in the query q, and "(t in q)" represents summation of the item t in the query q. _score (q, d) represents the relevance score of a document d for the query q, which can yield the score of the document d with respect to the one or more key words. As described above, tf(t in d) is related to term frequency of the item t in the document d, idf(t) represents the inverse document frequency of the item t, and norm(t, d) represents the field-length norm. Moreover, norm(t, d) may also reflect the index-time field-level weight (also referred to as "boost"). For example, compared with the content field, norm(t, d) may be improved for the title field. t.getBoost( ) represents the weight applied to the query q. For instance, t.getBoost( ) may include the weight corresponding to the key word determined at block 210 in FIG. 2. queryNorm(q) is a query normalization factor. coord(q, d) is a coordinating factor which may be associated with the number of key words appearing in the field of the document described above. That is, if the number of key words appearing in document d is greater, coord(q, d) may be increased.

When a plurality of query clauses are combined using a compound query like the bool query, the score of each of these query clauses is combined so as to calculate the total score of the document. By way of example, rather than for limitation, Elasticsearch is used as the primary store of the search engine 110 for all of the indexed data. For example, "sport" may be used as a key word to perform an Elasticsearch query to obtain the score of the document 121 with respect to the key word "sport." By combining the scores for the key word "sport" and other key words, the score of the document 121 for the document category "sport" may be obtained.

Returning to FIG. 2, at block 230, the search engine 110 may determine that the document is in the document category in response to the score of the document 121 being greater than a threshold. The score of the document 121 with respect to the one or more key words actually reflects the score of the document 121 for the document category. As described above, the higher the score ("_score") of the document 121 is, the more relevant the document 121 is to the document category. The threshold may be set by the user. The search engine 110 may compare the score of the document 121 with the threshold. If the score of the document 121 is greater than the threshold, it may be determined that the document 121 is in the document category.

Figure 3:
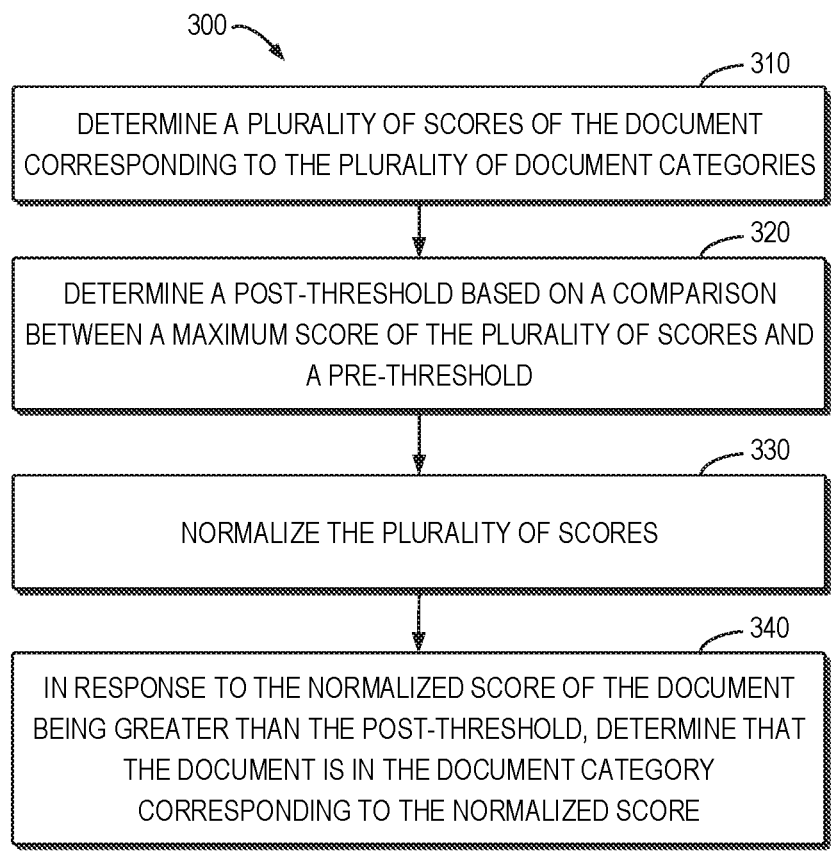

FIG. 3 shows a flowchart of a method 300 of determining if a document is in a document category based on a score in accordance with an embodiment of the present disclosure. For example, the method 300 can be implemented by the search engine 110 shown in FIG. 1. It is to be understood that the method 300 may further include additional blocks not shown and/or omit some blocks as shown, and the scope of the present disclosure is not limited in this regard.

At block 310, according to the methods described by blocks 210 and 220 of FIG. 2, the search engine 110 may determine a plurality of scores of the document corresponding to the plurality of document categories, respectively. Table 2 below illustrates the score (also referred to as "original score") of the document for each document category, where only for the purpose of illustration, three documents (document 1, document 2 and document 3) and four document categories (art, culture, economy and geography) are shown.

TABLE 2

Score of the document for each document category

|  | Art | Culture | Economy | Geography |
|---|---|---|---|---|
| Document 1 | 3.605526 | 7.70771 | 43.48623 | 4.137467 |
| Document 2 | 22.44805 | 23.39957 | 66.25324 | 11.90349 |
| Document 3 | 5.156977 | 11.86516 | 47.80018 | 7.652769 |

At block 320, the search engine 110 may determine a post-threshold based on a comparison between a maximum score of the plurality of scores and a pre-threshold. For example, for the document 2 shown in Table 2, the maximum score is 66.25324. The pre-threshold may be set as 60 in a centesimal system. It is noted that this numerical value is only given by way of example without limiting scope of the present disclosure in any manner. The pre-threshold for the original score may be an empirical value or set dynamically based on the dictionary training result. As depicted below, the post-threshold will be applied to a normalized score. In some embodiments, if the maximum score (max_score) of the backup document is larger than or equal to the pre-threshold, then the post-threshold may be set as Golden Section (namely, 0.618); if the maximum score of the backup document is between the pre-threshold and ½ of the pre-threshold, then the post-threshold may be set as $\sqrt{\text{GoldenSection}}$; if the maximum score of the backup document is between ½ of the pre-threshold and an empirical value (low limitation; such as 5), then the post-threshold may be set as 1; and if the maximum score of the backup document is smaller than this empirical value, the post-threshold may be set as 2. The above logic of setting the post-threshold may be expressed with the following equation:

$$\text{post-threshold} = \begin{cases} \text{Golden section,} & \text{max\_score} \geq \text{pre-threshold} \\ \sqrt{\text{Golden section}}, & \text{pre-threshold} \geq \text{max\_score} \geq \dfrac{\text{pre-threshold}}{2} \\ 1, & \dfrac{\text{pre-threshold}}{2} \geq \text{max\_score} \geq \text{low limitation} \\ 2, & \text{max\_score} < \text{low limitation} \end{cases} \quad (4)$$

At block 330, the search engine 110 may normalize the plurality of scores of the document for different document categories. As can be seen from Table 2 above, the score (also referred to as "original score") of the document is generally not between 0 and 1. To facilitate setting a proper threshold and determining whether to add category tags, the original scores of the document may be normalized. Thus, both the original score and normalized score of the document may be obtained. For example, the plurality of scores of the document may be normalized using the following equation:

$$\text{Normalized Score} = \dfrac{\text{Score} - \text{Minimum Score}}{\text{Maximum Score} - \text{Minimum Score}}. \quad (5)$$

where Normalized Score represents the normalized score, Score represents the score of a specific document for a specific document category, Minimum Score represents the minimum score of the same document among different document categories, and Maximum Score represents the maximum score of the same document among different document categories.

Taking the original scores of document 2 shown in the above Table 2 as an example (the minimum score is 11.90349 and the maximum score is 66.25324), its normalized scores are shown in the following Table 3.

TABLE 3

| Normalized scores | | | | |
|---|---|---|---|---|
| | Art | Culture | Economy | Geography |
| Document 2 | 0.194 | 0.2115 | 1 | 0 |

At block 340, the search engine 110 may determine that the document is in the document category corresponding to the normalized score, in response to the normalized score of the document being greater than the post-threshold. As long as the post-threshold is determined, the search engine 110 may compare the normalized score with the post-threshold. If the normalized score for a specific document category is greater than the post-threshold, it may be considered that the document is in the document category.

As depicted above, the search engine 110 may use a dynamic post-threshold to determine whether the backup file is in a certain document category or not. In one embodiment, the reason for adjusting the post-threshold dynamically is as follows. If the original scores of the document for several document categories are all high (which means that the document has high relevance to these several document categories), then a relative lower post-threshold may be used, so as to mark the document as being in all these document categories with high relevance. However, if the original scores of the document for several document categories are all low, the post-threshold will be elevated dynamically, so as to mark the document as being in fewer document categories or even mark the document as not being in any document category (marked as the document category "other").

In the technical solution of the present disclosure, by determining the key words associated with the document category and the corresponding weights, using the relevance score and then utilizing a self-defined algorithm, it may be determined whether the backup file is in a specific document category or not, so as to achieve automatic categorization for backup data.

Returning to FIG. 2, at optional block 240, in response to determining that the document 121 is in the document category, the search engine 110 may apply a tag corresponding to the document category to the document 121. For example, if it is determined that the document 121 is in the document category "sport," the search engine 110 may add a tag for indicating the document category "sport" to the document 121.

At optional block 250, the search engine 110 may further provide a query result including the document 121 and the tag in response to a query request for the document 121. After the backup document 121 is categorized and tagged, when the user searches the document 121, the search result will include the document 121 and a category tag that the document 121 has.

Figure 4:
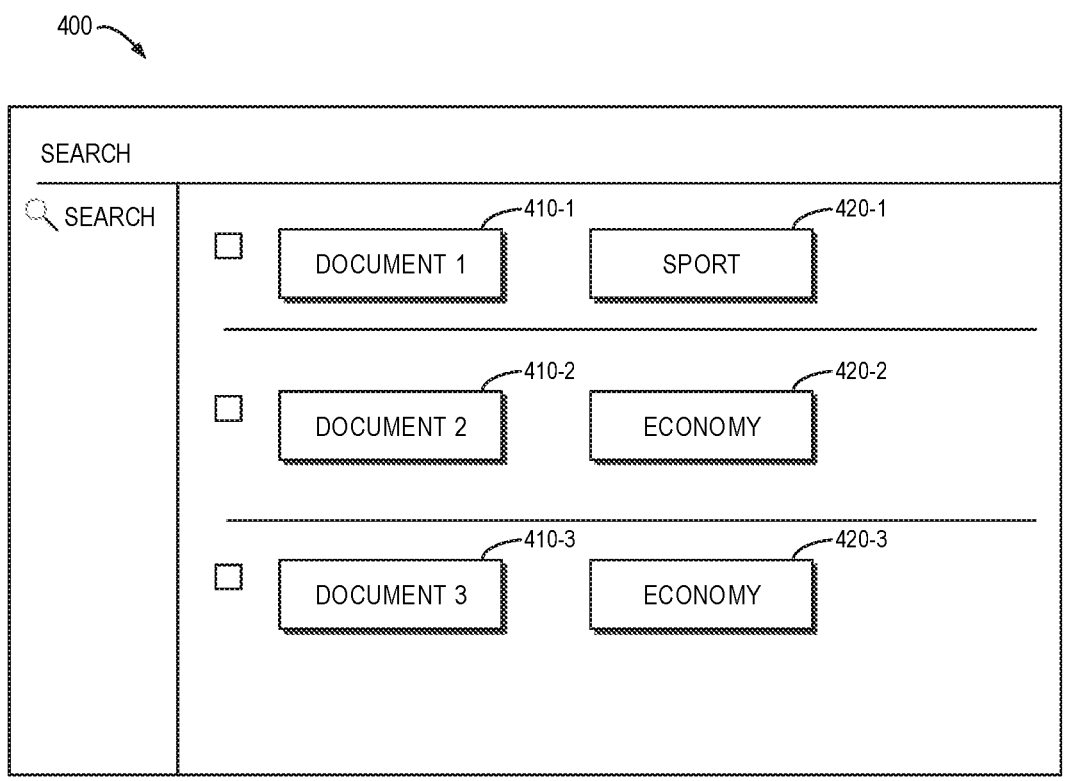

FIG. 4 shows a schematic diagram of a query result 400 in accordance with an embodiment of the present disclosure. For the sake of simplicity, the query result 400 only includes three documents 410: document 1 410-1, document 2 410-2 and document 3 410-3. Meanwhile, the query result 400 further includes tags 420 of the document categories which documents 410 are in; a tag 420-1 corresponding to the document 1 410-1, a tag 420-2 corresponding to the document 2 410-2, and a tag 420-3 corresponding to the document 3 410-3. When viewing the query result 400, the user can know easily: the content of document 1 410-1 is associated with the document category "sport"; and the content of the document 2 410-2 and document 3 410-3 is both associated with the document category "economy."

In some embodiments, when the score of the document with respect to the one or more key words is determined, the search engine 110 may normalize the weights of the key words shown in Table 1. The search engine 110 may determine the score of the document based on the normalized weights. As shown in Table 1, although the weights of the trained key words are between 0 and 1, it is still possible to normalize the weights shown in Table 1. The normalization of weights may be performed using the following equation:

$$\text{Normalized Weight} = \frac{\text{Weight} - \text{Minimum Weight in Category}}{\text{Maximum Weight in Category} - \text{Minimum Weight in Category}} \quad (6)$$

where Normalized Weight denotes a normalized weight, Weight represents a weight, Minimum Weight in Category represents the minimum weight in the document category, and Maximum Weight in Category represents the maximum weight in the document category.

In this way, the key words with high weights will have even higher weights, and the key words with low weights will have much lower weights, which can improve accuracy of categorization. Using the key words and corresponding normalized weights, a query for the document content may be performed so as to obtain the score for each document category. Table 4 below shows a test result of normalized weights performed for a plurality of documents. Table 4 shows that for the same document category containing 500, 600, 700, 800, 900 and 1000 key words, respectively, the accuracy of categorization can be improved when the normalized weights are used to perform the query.

TABLE 4

| Test result for normalized weights | | | |
|---|---|---|---|
| Number of key words | Accuracy without normalization | Accuracy after normalization | Improved |
| 500 | 87.69% | 88.43% | 0.8% |
| 600 | 88.93% | 88.93% | 0.0% |
| 700 | 88.76% | 89.59% | 0.9% |
| 800 | 89.42% | 90.25% | 0.9% |
| 900 | 88.51% | 90.17% | 1.9% |
| 1000 | 88.26% | 90.66% | 2.7% |

In some embodiments, it is possible to search the key words in the title field, content field or both to determine the score of the document. In some embodiments, the key words may be searched only in the content field of the document. Table 5 below demonstrates that searching the key words only in the content field of the document instead of in both the content field and the title field can improve accuracy of categorization. In test, the weight for the title field is set as 1.

TABLE 5

Test result with and without title field

| Number of key words | Accuracy for only content field | Accuracy for both content and title fields | Improved |
|---|---|---|---|
| 500 | 88.43% | 83.97% | −5.0% |
| 600 | 88.93% | 82.73% | −7.0% |
| 700 | 89.59% | 83.80% | −6.5% |
| 800 | 90.25% | 83.72% | −7.2% |
| 900 | 90.17% | 83.55% | −7.3% |
| 1000 | 90.66% | 85.29% | −5.9% |

Furthermore, Table 6 below shows a comparison result between standard analyzer and English analyzer. An analyzer may be used for word segmentation processing of documents in the query. The test in Table 6 is performed for multiple English documents. However, it is to be understood that principles of the present disclosure are applicable to any language, not limited to English. Table 6 shows that standard analyzer can yield more accurate categorization.

TABLE 6

Test result for standard analyzer and English analyzer

| Number of key words | Accuracy of standard analyzer | Accuracy of English analyzer | Improved |
|---|---|---|---|
| 500 | 88.43% | 86.94% | −1.7% |
| 600 | 88.93% | 86.53% | −2.7% |
| 700 | 89.59% | 86.45% | −3.5% |
| 800 | 90.25% | 86.36% | −4.3% |
| 900 | 90.17% | 85.87% | −4.8% |
| 1000 | 90.66% | 85.79% | −5.4% |

Figure 5:
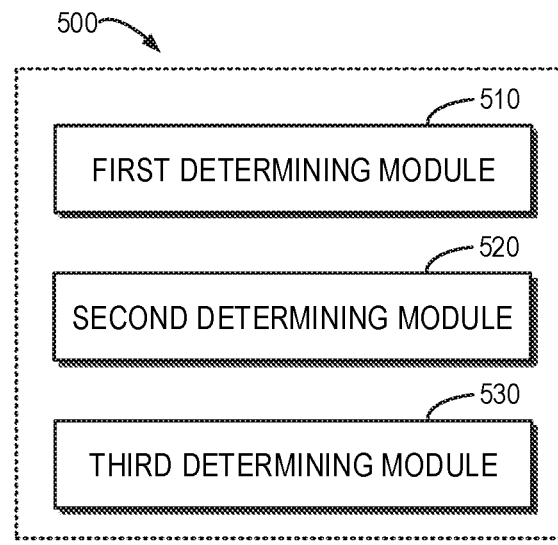

FIG. 5 shows a block diagram of an apparatus 500 for categorizing a document in accordance with an embodiment of the present disclosure. In some embodiments, the apparatus 500 may be, for instance, implemented at the search engine 110. Alternatively, in some embodiments, the apparatus 500 may be implemented directly as the search engine 110 per se, that is, the search engine 110 may be implemented by the apparatus 500.

As shown in FIG. 5, the apparatus 500 may include a first determining module 510 which is configured to determine one or more key words associated with a document category and corresponding weights. The apparatus 500 may further include a second determining unit 520 which is configured to determine, at least based on frequencies of the one or more key words appearing in a field of the document and the weights, a score of the document with respect to the one or more key words. Moreover, the apparatus 500 may further include a third determining module 530 which is configured to determine that the document is in the document category in response to the score of the document being higher than a threshold.

In some embodiments, the one or more key words and the weights are obtained by a neural network trained based on a text corpus.

In some embodiments, the field of the document comprises at least one of a title field and a content field.

In some embodiments, the field of the document comprises only a content field.

In some embodiments, the second determining module 520 determines the score of the document further based on at least one of: the number of key words of the one or more key words appearing in the field of the document; a length of the field of the document; and if the document is selected from a plurality of documents, the number of documents of the plurality of documents in which the key words appear.

In some embodiments, the second determining module 520 may include a normalization submodule configured to normalize the weights. The second determining module 520 may further include a determining submodule configured to determine the score of the document based on the normalized weights.

In some embodiment, the document category is selected from a plurality of document categories. The apparatus 500 may further include a fourth determining module which is configured to determine a plurality of scores of the document corresponding to the plurality of document categories. The apparatus 500 may further include a fifth determining module which is configured to determine a post-threshold based on a comparison between a maximum score of the plurality of scores and a pre-threshold. The apparatus 500 may further include a normalization module which is configured to normalize the plurality of scores. Moreover, the apparatus 500 may further include a sixth determining module which is configured to determine that the document is in the document category corresponding to the normalized score in response to the normalized score of the document being greater than the post-threshold.

In some embodiments, the apparatus 500 may further include an application module which is configured to apply a tag corresponding to the document category to the document in response to determining that the document is in the document category.

In some embodiments, the apparatus 500 may further include a providing module which is configured to provide a query result comprising the document and the tag in response to a query request for the document.

For the sake of clarity, some optional modules of the apparatus 500 are not shown in FIG. 5. However, it is to be understood that various features as described with reference to FIGS. 1-4 are likewise applicable to the apparatus 500. Furthermore, various modules of the apparatus 500 may be hardware modules or software modules. For example, in some embodiments, the apparatus 500 may be partially or completely implemented using software and/or firmware, e.g., implemented as a computer program product embodied on a computer readable medium. Alternatively or additionally, the apparatus 500 may be partially or completely implemented based on hardware, for example, implemented as an integrated circuit (IC) chip, an application specific integrated circuit (ASIC), a system on chip (SOC), a field programmable gate array (FPGA) and so on. The scope of the present invention is not limited in this aspect.

Figure 6:
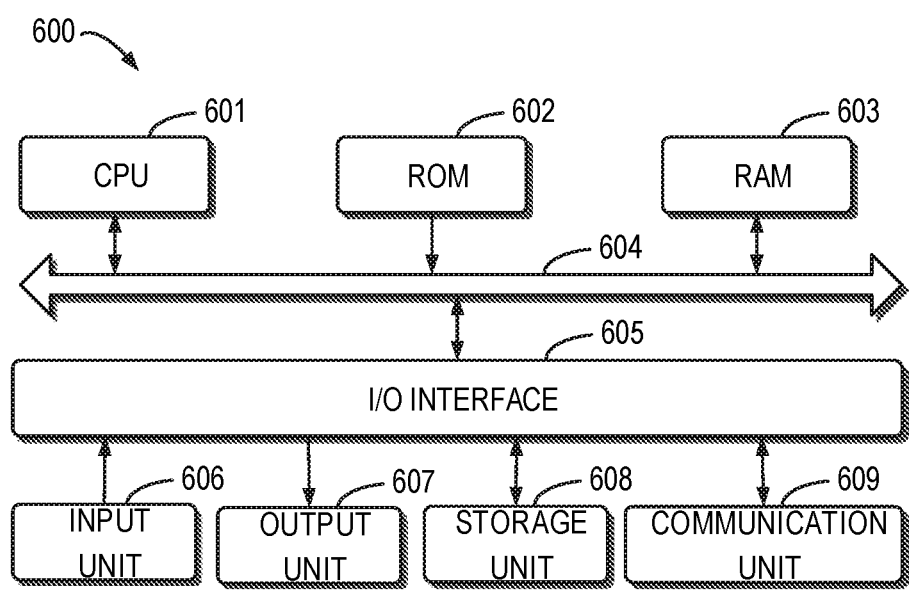

FIG. 6 illustrates a schematic block diagram of an example device 600 that may be used to implement embodiments of the present disclosure. As shown in FIG. 6, the device 600 includes a central processing unit (CPU) 601 which can perform various appropriate actions and processes based on computer program instructions stored in a read-only memory (ROM) 602 or computer program instructions loaded from a storage unit 608 into a random access memory (RAM) 603. In RAM 603, there are also stored various programs and data required by the device 600 when operating. The CPU 601, ROM 602 and RAM 603 are connected to one another via a bus 604. An input/output (I/O) interface 605 is also connected to the bus 604.

A plurality of components of the device 600 are connected to the I/O interface 605, including: an input unit 606 comprising a keyboard, a mouse, and the like; an output unit 607, such as various types of displays, loudspeakers, and the like; a storage unit 608 including a magnetic disk, an optical disk, and the like; and a communication unit 609 including a LAN card, a modem, a wireless communication transceiver and so on. The communication unit 609 allows the device 600 to exchange information/data with other devices via a computer network, such as the Internet, and/or various telecommunications networks.

The above-described procedures and processes, such as the method 200, can be implemented by the processing unit 601. For example, in some embodiments, the method 200 can be implemented as a computer software program which is tangibly embodied on a machine readable medium, for instance, the storage unit 608. In some embodiments, part or all of the computer program can be loaded to and/or installed on the device 600 via the ROM 602 and/or the communication unit 609. The computer program, when loaded to the RAM 603 and executed by the CPU 601, may execute one or more acts of the method 200 as described above. Alternatively, the CPU 601 can also be configured to implement the method 200 as described above in any other proper manner (for example, by means of firmware).

The present disclosure provides embodiments for automatic categorization for a document. The document may be categorized into the corresponding document category automatically enabling the end user to query by the category tags. This is really usable when there exists a large number of documents. The automatic categorization method of the present disclosure may be used in combination with any type of search products to provide rich search functions to the user. For example, the method of the present disclosure may perform automatic categorization for all the indexed backup documents in a search product. After categorization of the documents, the search product can support search by the document categories, so that it will be much easier for the end user to search and locate corresponding files among a large amount of data based on different categories. Therefore, embodiments of the present disclosure may meet more customers' requirements and improve the overall customer satisfaction.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of categorizing a document, comprising:
   determining a key word and a weight associated with a document category;
   determining, at least based on a frequency of the key word appearing in a field of the document and the weight, a score of the document with respect to the key word; and
   in response to the score of the document being greater than a threshold, determining that the document is in the document category, wherein the document category is one of a plurality of document categories;
   determining a plurality of scores of the document corresponding to the plurality of document categories;
   determining a post-threshold based on a comparison between a maximum score of the plurality of scores and a pre-threshold;
   normalizing the plurality of scores to obtain a plurality of normalized scores; and
   in response to a normalized score of the plurality of normalized scores of the document being greater than the post-threshold, determining that the document is in the document category corresponding to the normalized score.

2. The method according to claim 1, wherein the key word and the weight are obtained by a neural network trained based on a text corpus.

3. The method according to claim 1, wherein the field of the document comprises at least one of a title field and a content field.

4. The method according to claim 1, wherein the field of the document comprises only a content field.

5. The method according to claim 1, wherein determining the score of the document is further based on at least one of:
   the number of key words appearing in the field of the document, wherein the key word is one of the key words;
   a length of the field of the document; and
   the number of documents of a plurality of documents in which the key words appear, wherein the document is one of the plurality of documents.

6. The method according to claim 1, wherein determining the score of the document comprises:
   normalizing a plurality of weights to obtain a plurality of normalized weights, wherein the weight is one of the plurality of weights; and
   determining the score of the document base d on the plurality of normalized weights.

7. The method according to claim 1, further comprising:
   in response to determining that the document is in the document category, applying a tag corresponding to the document category to the document.

8. The method according to claim 7, further comprising:
   in response to a query request for the document, providing a query result comprising the document and the tag.

9. An electronic device, comprising:
   at least one processing unit; and
   at least one memory coupled to the at least one processing unit and storing instructions executable by the at least one processing unit, the instructions, when executed by the at least one processing unit, causing the electronic device to perform a method, the method comprising:
   determining a key word and a weight associated with a document category;
   determining, at least based on a frequency of the key word appearing in a field of the document and the weight, a score of the document with respect to the key word; and
   in response to the score of the document being greater than a threshold, determining that the document is in the document category, wherein the document category is selected from a plurality of document categories;
   determining a plurality of scores of the document corresponding to the plurality of document categories;
   determining a post-threshold based on a comparison between a maximum score of the plurality of scores and a pre-threshold;
   normalizing the plurality of scores to obtain a plurality of normalized scores; and
   in response to the a normalized score of the plurality of normalized scores of the document being greater than the post-threshold, determining that the document is in the document category corresponding to the normalized score.

10. The electronic device according to claim 9, wherein the key word and the weight are obtained by a neural network trained based on a text corpus.

11. The electronic device according to claim 9, wherein the field of the document comprises at least one of a title field and a content field.

12. The electronic device according to claim 9, wherein the field of the document comprises only a content field.

13. The electronic device according to claim 9, wherein determining the score of the document is further based on at least one of:
the number of key words appearing in the field of the document, wherein the key word is one of the key words;
a length of the field of the document; and
the number of documents of a plurality of documents in which the key words appear, wherein the document is one of the plurality of documents.

14. The electronic device according to claim 9, wherein determining the score of the document comprises:
normalizing a plurality of weights to obtain a plurality of normalized weights, wherein the weight is one of the plurality of weights; and
determining the score of the document based on the plurality of normalized weights.

15. The electronic device according to claim 9, wherein the method further comprises:
in response to determining that the document is in the document category, applying a tag corresponding to the document category to the document.

16. The electronic device according to claim 15, wherein the method further comprises:
in response to a query request for the document, providing a query result comprises the document and the tag.

17. A computer program product being tangibly stored on a non-transitory computer readable medium and comprising machine executable instructions which, when executed, causing a machine to perform a method, the method comprising:
determining a key word and a weight associated with a document category;
determining, at least based on a frequency of the key word appearing in a field of the document and the weight, a score of the document with respect to the key word; and
in response to the score of the document being greater than a threshold, determining that the document is in the document category, wherein the document category is one of a plurality of document categories;
determining a plurality of scores of the document corresponding to the plurality of document categories;
determining a post-threshold based on a comparison between a maximum score of the plurality of scores and a pre-threshold;
normalizing the plurality of scores to obtain a plurality of normalized scores; and
in response to a normalized score of the plurality of normalized scores of the document being greater than the post-threshold, determining that the document is in the document category corresponding to the normalized score.

18. The computer program product according to claim 17 being tangibly stored on a non-transient computer readable medium and comprising machine executable instructions which, when executed, causing a machine to perform a method, the method further comprising:
in response to determining that the document is in the document category, applying a tag corresponding to the document category to the document; and
in response to a query request for the document, providing a query result comprises the document and the tag.

* * * * *